(12) United States Patent
Jacobson

(10) Patent No.: US 6,401,458 B2
(45) Date of Patent: Jun. 11, 2002

(54) PNEUMATIC/MECHANICAL ACTUATOR

(75) Inventor: Michael Dean Jacobson, Ridgecrest, CA (US)

(73) Assignee: Quoin International, Inc., Ridgecrest, CA (US)

( * ) Notice: Subject to any disclaimer, the term of this patent is extended or adjusted under 35 U.S.C. 154(b) by 0 days.

(21) Appl. No.: 09/797,342

(22) Filed: Feb. 28, 2001

Related U.S. Application Data

(60) Provisional application No. 60/185,537, filed on Feb. 28, 2000.

(51) Int. Cl.[7] ............................................. F02D 23/00
(52) U.S. Cl. ........................... 60/602; 60/726; 60/727; 60/39.42
(58) Field of Search .................. 60/597, 370, 726, 60/727, 39.42, 602

(56) References Cited

U.S. PATENT DOCUMENTS

| | | | | |
|---|---|---|---|---|
| 3,990,242 A | * | 11/1976 | Muller | 60/597 |
| 5,079,913 A | * | 1/1992 | Kishishita | 60/597 |
| 5,400,596 A | * | 3/1995 | Shlien | 60/597 |
| 5,515,675 A | * | 5/1996 | Bindschatel | 60/370 |

* cited by examiner

Primary Examiner—Hoang Nguyen
(74) Attorney, Agent, or Firm—Kenneth G. Pritchard

(57) ABSTRACT

A pneumatic/mechanical actuator described herein consists of a variation of a Brayton-cycle machine for generating actuation force. The system avoids the continues heat problem of a Brayton-cycle by using compressed gas to drive a reversible turbine. The turbine only is driven when a change of actuation position. The system includes an internal-combustion engine-air compressor, a pneumatic energy storage and transfer system, a fuel/air mixing means, two electric pilot valves, two lean-ratio high-pressure catalytic-bed burners, a small-diameter and reversible turbine, a ratio speed-reducing transmission, an optical-encoder feedback position and speed sensor and a ball-screw push-rod mechanism. An alternative embodiment uses a free piston engine compressor hybrid to provide the compressed air. Manual or computer control may be used to monitor and direct desired changes in actuator position.

17 Claims, 5 Drawing Sheets

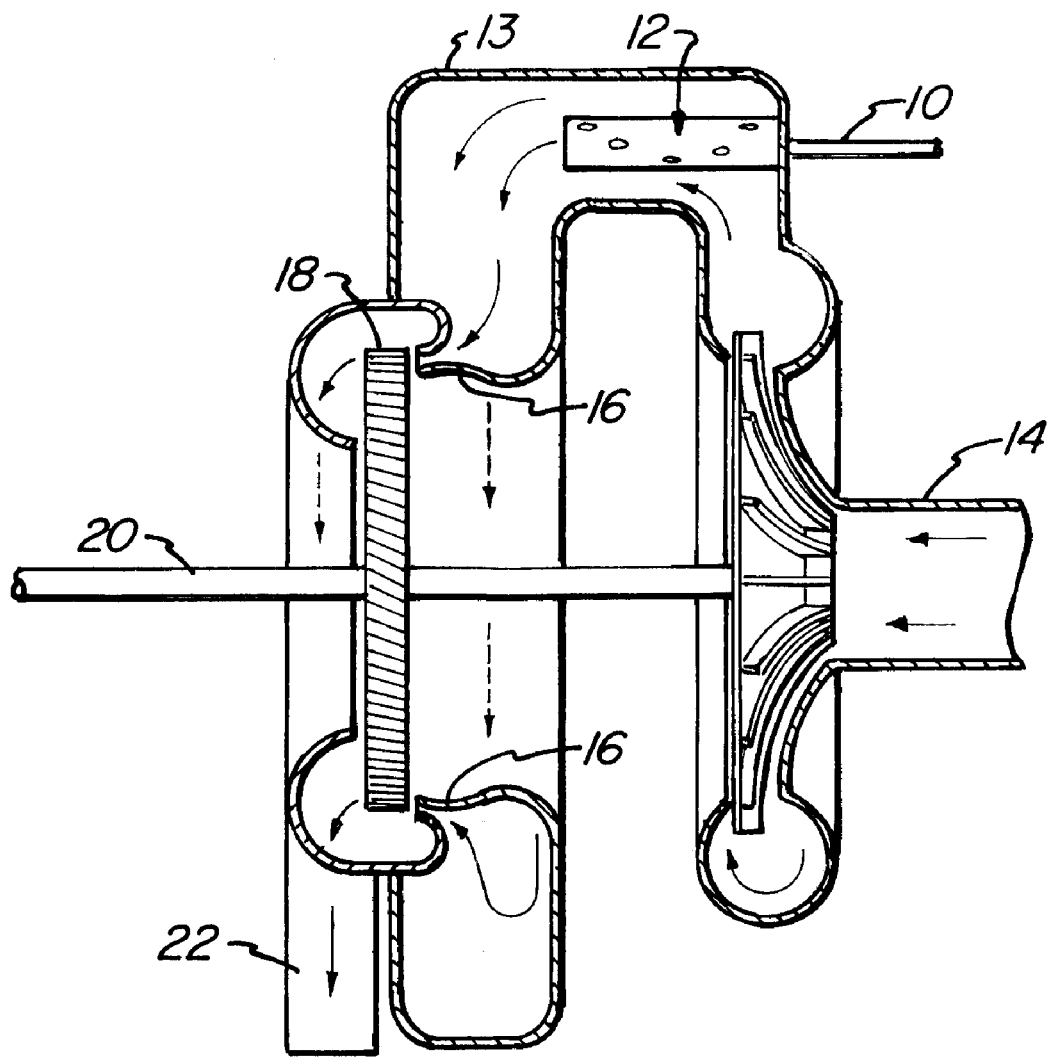
FIG.—1
(PRIOR ART)

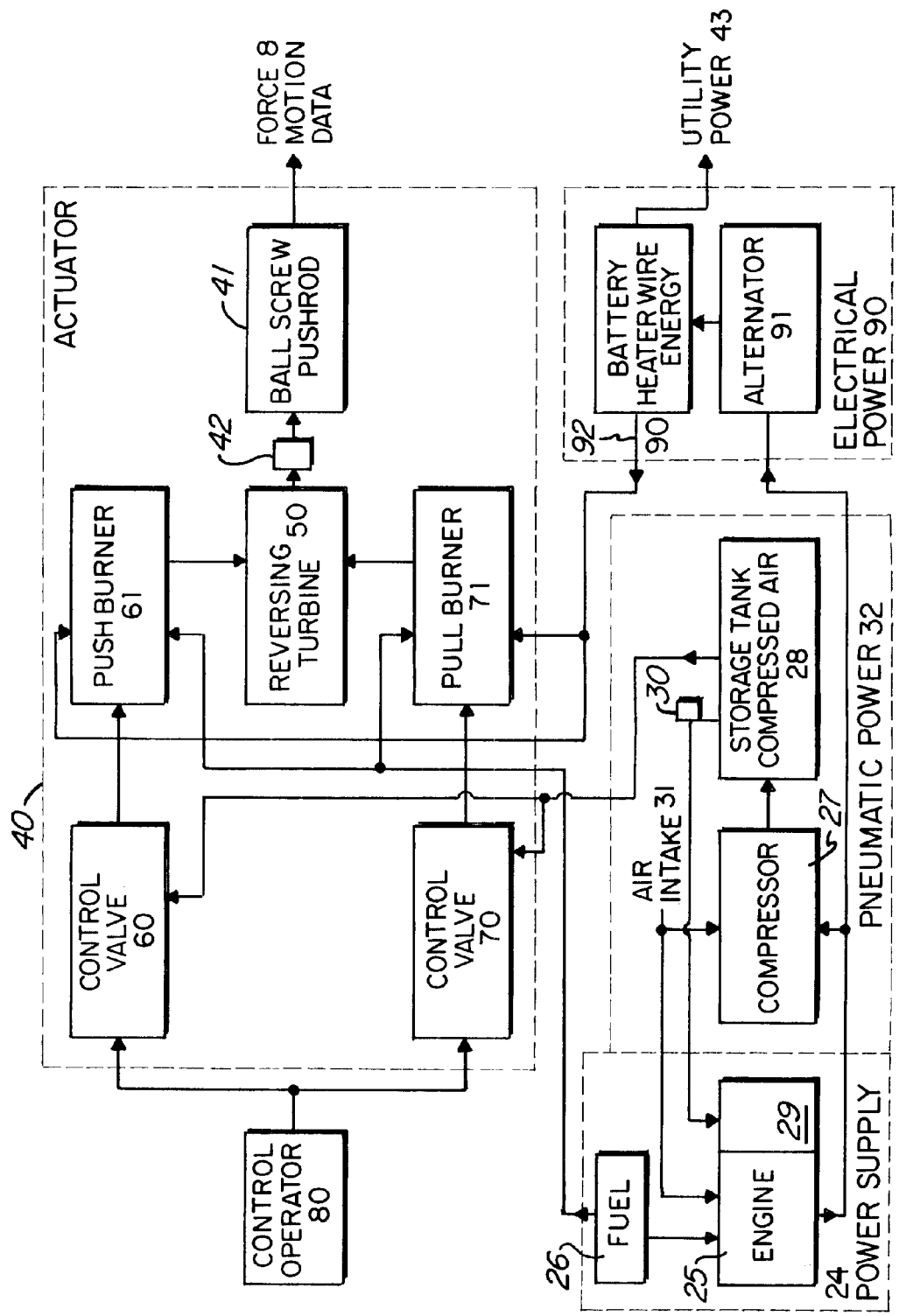
FIG—2

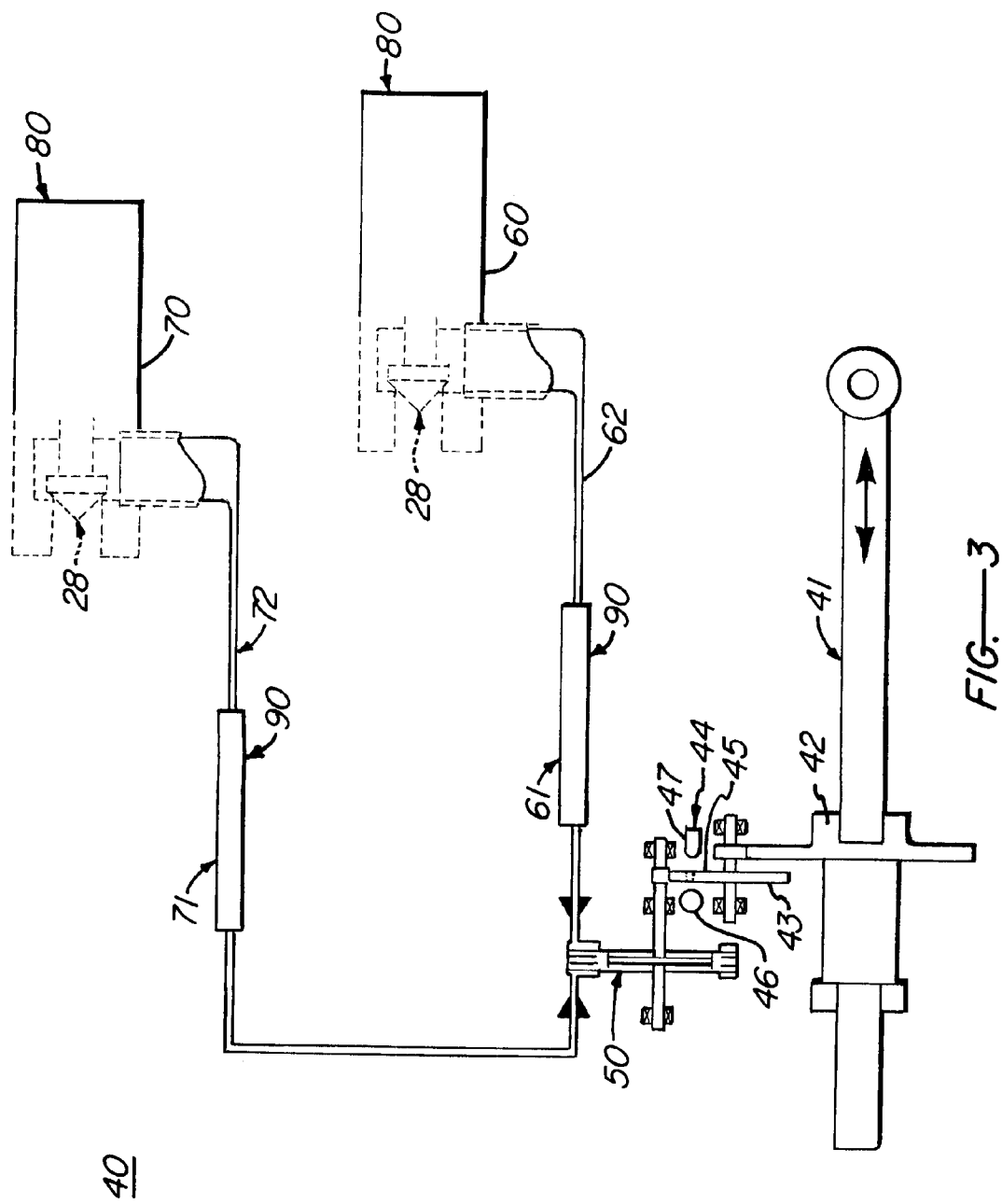

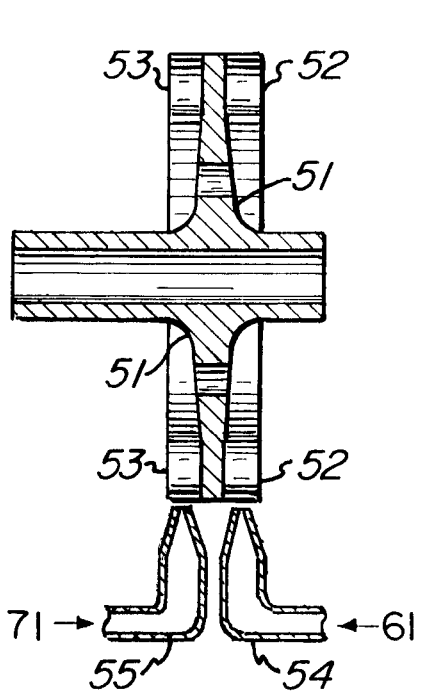
FIG.—4
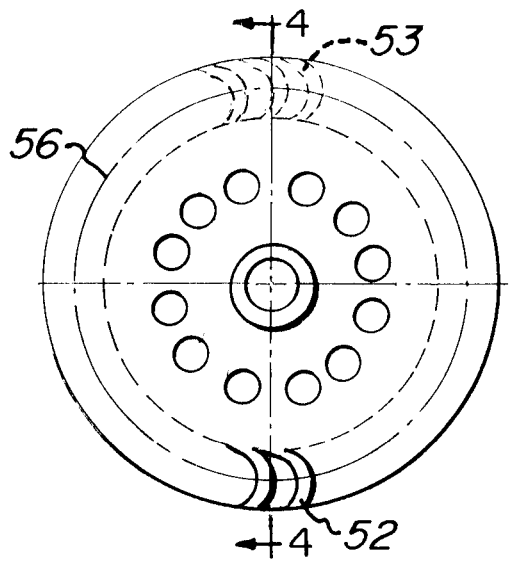
FIG.—5
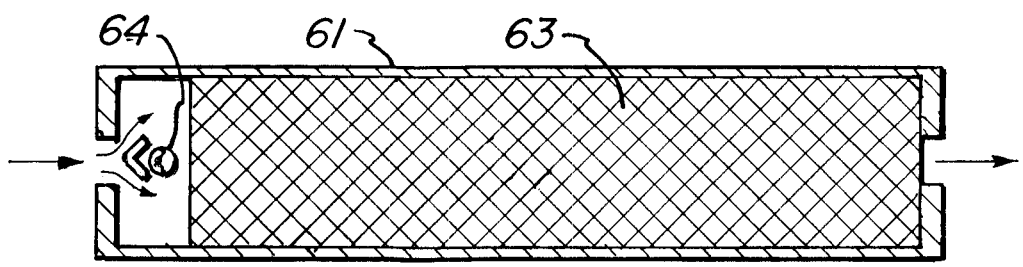
FIG.—6

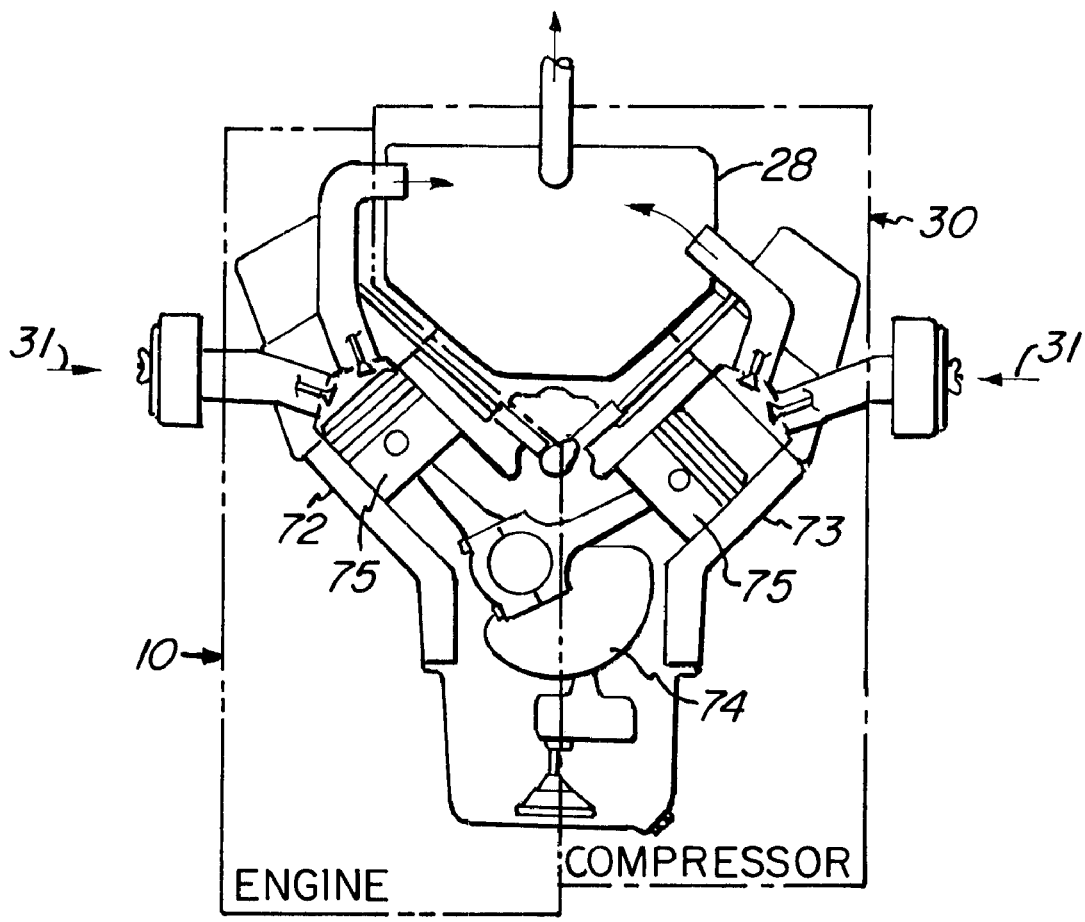
FIG.—7
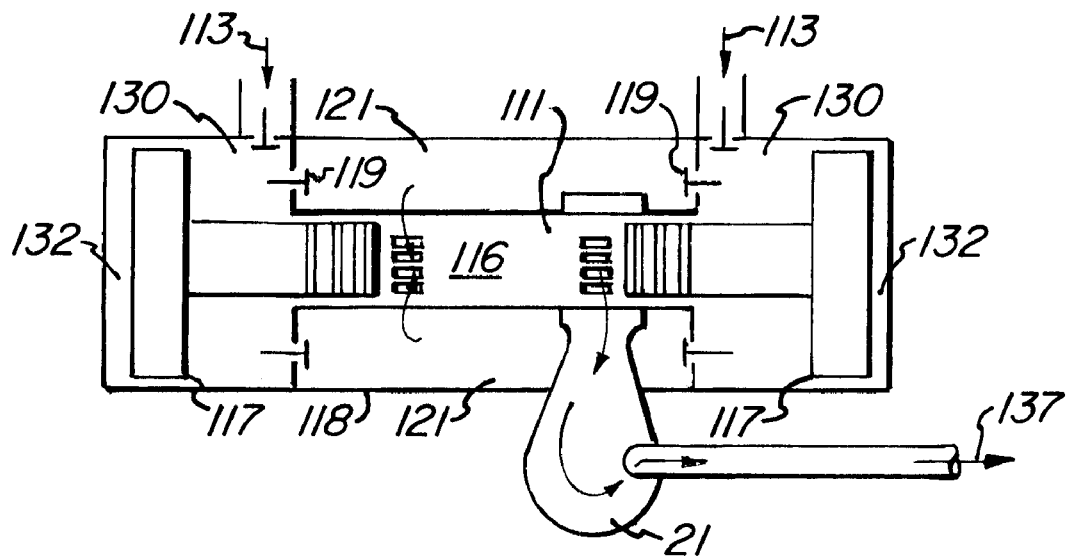
FIG.—8

US 6,401,458 B2

PNEUMATIC/MECHANICAL ACTUATOR

CROSS REFERENCE TO RELATED APPLICATIONS

This application claims the benefit of U.S. Provisional Application Ser. No. 60/185,537, filed Feb. 28, 2000, the disclosure of which is incorporated herein by reference.

BACKGROUND OF THE INVENTION

1. Field of the Invention

This invention relates generally to the field of actuation systems, and more particularly to a pneumatic/mechanical robotic-system actuator. Specifically, this actuation system provides efficient and direct chemical (fuel) to mechanical energy conversion using a combined internal-combustion free-piston or piston-crank engine-air compressor to generate pressurized air as a working fluid. The invention further relates to an autonomous power supply that can support actuation function for long periods of time using only chemical energy. As in a Brayton-cycle, this is fed through lean-burn catalytic reactors into a drive turbine to operate a ball-screw push rod mechanism. The resultant actuator is thermodynamically efficient, providing significant force in addition to rapid, precise, and large-displacement motion.

2. Description of Prior Art

Actuators are used in many mechanical systems to produce motion. The primary types include hydraulic, pneumatic, and electric motor driven systems. These systems are designed to provide motive force, rapid motion (with high frequency bandwidth response) and precise positioning. At the same time such systems must not sacrifice too much energy or consume too much working fluid. Another desired attribute is the ability to produce high power output from a small, compact package, i.e. having high energy-density. While the above qualities and benefits are needed in actuation systems, the technology used dictates the limits and compromises of each system with respect to providing all the features. Generally, a system will provide the advantages of some, but not all, desired features. No prior actuation system has been able to operate on compressed air provided by a small fuel-efficient internal combustion engine-compressor. To date compressed air systems could not simultaneously provide rapid response, low fuel consumption, low working fluid loss, and significant output force. A significant problem of Brayton-cycle machine is the continuous high temperature that quickly erodes components.

Prior technologies include pneumatic (compressed air) systems, hydraulic systems, and electromechanical systems.

The prior technologies are deficient in certain critical functions. The pneumatic system except when very high pressures are used is typically a poor performer in the areas of stiffness, of providing high bandwidth, and of maintaining position accuracy. The hydraulic system has a problem with high consumption of working fluid while providing both large-displacement motion and high force. The electromechanical systems are most common. These become excessively large and complex because of heavy batteries if designed to generate both a high force and rapid motion. Electrical batteries are present in a large number of forms. For this application, batteries would provide adequate performance for approximately 20–30 minutes. They would then be recharged or discarded. FIG. 1 is a prior art continuous-combustion gas turbine known also as a Brayton-cycle gas turbine. A combustible fuel, such as gasoline, is provided via input 10 to a burner 12 which ignites the fuel by mixing it with compressed air from an air compressor 14 in manifold 13. After fuel ignition burning and mixing high temperature gases are allowed to exit via nozzles 16. As is well known nozzles provide areas where gas pressure is decreased and velocity increased. After passing through nozzles 16 high velocity gas turns a turbine wheel 18 which in turn drives a load via shaft 20. Spent gas is vented via exhaust 22.

A Brayton-cycle machine is thus built using a compressor to feed air under pressure to an air transfer manifold 13. The bypass air flow mixing and combustion chamber burning permits a constant pressure heat addition. The addition of heat energy to the cycle at a constant pressure is the unique feature that characterizes the Brayton-cycle process. This process may include flow mixing between bypass air and combustor outlet air. The expansion process uses turbine 18 as the energy extractor. Exhaust 22 constitutes constant pressure heat removal. Because of the desired constant high temperature heat addition in manifold 13, the related components burner 12, manifold 13, nozzles 16, and turbine wheel 18 quickly erode.

SUMMARY OF THE INVENTION

The primary object of the present invention is an actuator with efficient conversion of chemical (fuel) into mechanical energy in the form of compressed air that generates a force to move objects without high temperature erosion problems for working components.

Another object of the invention is an actuator providing precise movement.

Another object of the invention is an actuator with large-displacement motion.

A further object of the invention is an actuator producing rapid motion.

Yet another object of the invention is an actuator providing conversion of energy from fuel into compressed air using an integrated free-piston or piston-crank internal combustion engine-air compressor.

A final object of the invention is to provide an actuator with high-energy density that offers compact packaging and high power output.

Other objects and advantages of the present invention will become apparent from the following descriptions, taken in connection with the accompanying drawings, wherein, by way of illustration and example, an embodiment of the present invention is disclosed.

The machine described is for generating actuation force with rapid, precise, and large-displacement motion comprising: an internal combustion engine-air compressor energy source, a pneumatic working fluid, two high pressure burners, two control valves, a reversible turbine, a speed-reducing transmission, a ball-screw push-rod mechanism, an optical encoder and a control system.

Like a Brayton-cycle machine it uses two high-pressure burners coupled to a reversible-drive turbine and transmission to generate large-displacements with precise positioning using a ball-screw push rod.

Each of these relates to the present system; offering forms of energy transfer based on working fluid or mechanical drive to develop controlled forces. The present system emulates a hydraulic actuator in that it is capable of producing large-displacement motion and significant force. It relates to the pneumatic system in that the working fluid is compressed air. It is similar to the electro-mechanical actuator in that it uses a stiff output gear train and ball-screw push rod to generate force.

BRIEF DESCRIPTION OF THE DRAWINGS

FIG. 1 is a prior art Brayton-cycle shown in cross section;

FIG. 2 is a schematic block diagram of the complete system;

FIG. 3 is a schematic diagram illustrating operation of the actuator;

FIG. 4 is a cutaway diagram illustrating operation of the reversing turbine;

FIG. 5 is a side view of the reversing turbine;

FIG. 6 is a cutaway diagram illustrating operation of the hot catalytic-bed reactor;

FIG. 7 is a cutaway schematic diagram of one embodiment of internal combustion engine-air compressor; and FIG. 8 is similar to FIG. 5 except an integrated free-piston engine-air compressor is shown.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Turning first to FIG. 2 there is shown a schematic block diagram of the present invention for generating actuation force with rapid, precise, and large-displacement motion. In the preferred embodiment of the invention, system energy is provided by a first power supply 24. Power supply 24 may be a small internal-combustion engine 25 fed from a fuel tank 26. The fuel may be gasoline or any other combustible fuel. Engine 25 in turn is used to drive air compressor 27. Compressor 27 feeds compressed air to storage tank 28 which provides a reserve of compressed air at a predesired pressure. This portion of the system converts energy in the form of fuel into a mechanical form by driving a compressor that generates the compressed-air working fluid. It is automatically operable, when required, by use of starter 29. Starter 29 may be further controlled by a pressure-sensing switch 30 that senses the pressure of compressed air stored in compressed-air storage tank 28. Compressed-air storage tank 28 is charged with compressed air by air compressor 27 when compressor 27 is driven by engine 25 of power supply 24. Air intake means 31 feeds internal combustion engine 25 with air to sustain the combustion process of engine 25. Air intake means 31 also feeds air to air compressor 27 that feeds high-pressure air into the compressed-air storage tank 28. Fuel supply 26 functions to store and to passively feed fuel to both engine 25 and to actuator 40 as needed and on-demand, as determined by the actions of engine 25 and actuator 40. The functions of the power supply 24, and the pneumatic power system 32 (which includes air compressor 27, and compressed-air storage tank 28) are to combine to generate a supply of high-pressure air to act as the working fluid to power actuator 40. Compressed air from air storage tank 28 is fed to two control valves 60 and 70 within actuator 40. Control valves 60 and 70 receive direction from control operator 80 which may be an optical encoder or any computer for issuing output signals based on preselected sensor input, not shown. Manual human control may also be used to decide instructions to be issued. Two preferred embodiments of an integrated engine 25 and air-compressor 27 that offer the functions of both power supply 24 and pneumatic power system 32 within an integrated unit are further described in FIG. 6.

Actuator 40 provides bi-directional force and motion output through push rod 41 that consists of a ball-screw mechanical arm. Push rod 41 is driven by a rotation means 42. Rotation means 42 may consist of the output of a 32:1 rotary speed-reducing transmission coupled to a small high-speed (100 K rpm) reversing-turbine. The push-pull action of push rod 41 depends on the ability to reverse-drive a reversing turbine 50. This is accomplished by the action of control valves 60 and 70 as well as innovative design of the reversing turbine 50, to be described later in FIG. 4.

Reversing-turbine 50 receives power input from pneumatic power system 32 (and elements 60, 70, 61, 71) that, working together, control and deliver a supply of hot, high-pressure air. As in a Brayton-cycle machine, the air, supplied from the compressed-air tank 28, is fed to reversing turbine 50 through either one of two hot, high-pressure burners known as the push reactor burner 61 and the pull reactor burner 71, to be described in more detail later in FIG. 6. These burners receive high-pressure air from air storage tank 28 under the control of valves 60 and 70. Valves 60 and 70 consist of electrically-controlled pilot valves that switch high-pressure air under the control of small electrical currents supplied by the control operator system 80 based upon operator commands. Burners 61 and 71 function to heat the high-pressure input air from tank 21 to a temperature of about 1800° F. with the addition of fuel from supply 26, using an electrical power ignition system 90, and under the action of a catalyst-bed lean-burn combustion process within each burner. The functions of burners 61 and 71 are controlled separately, by the flow of air from control valves 60 or 70, to determine which burner will supply power to the reversing turbine 50. Burners 61 and 71 add heat at constant pressure. The energy content may be doubled or more with no significant change of pressure. By design, the choice of burner 61 or 71 also dictates the direction of rotation of turbine 50. This in turn determines the direction of motion (to push or to pull) that push rod 41 will produce; thereby meeting the needs and the functional requirements placed upon actuator system 40 by operator control system 80.

Finally, FIG. 2 shows the electric power system 90 which has an alternator 91 driven by engine 25. Alternator 91 charges a battery 92 which provides electrical power to actuator 40 and provides a utility power output 93 for other systems not shown. A further function of the electric power system 90 is to supply various sensors (such as pressure switches, optical encoders) and the engine starter 29 with electric power to support those functions. A final function of the electric power system 90 is to provide utility power output to support miscellaneous user needs; such as to provide lighting or to supply power tools with energy.

In accordance with the present invention, FIG. 3 shows a more detailed schematic diagram illustrating operation of the actuator 40 portion of the invention. Actuator 40 produces bi-directional force and motion output through push rod 41, a ball-screw mechanical arm. Push rod 41 is driven by a rotationally-operable ball bearing screw-jack means 42 which couples into the output of a 32:1 rotary speed reduction transmission means 43. Transmission means 43 input is driven by a reversing-turbine 50 which may be a small high-speed reversing turbine, for example turbine speed may be 100 K rpm. The push-pull bi-directional action of push rod 41 depends on the ability to reverse-drive turbine 50.

This function is accomplished by the action of control valves 60 and 70, as well as the reversing turbine 50 design described in FIG. 4.

Reversing-turbine 50 receives power input from hot, high-pressure air derived from pneumatic power system 32. Pressurized air is fed to turbine 50 through one of two high-pressure reactor-burners, the push reactor-burner 61 or the pull reactor-burner 71. These reactor-burners receive high-pressure air from air storage tank 28 under control of valves 60 and 70. Valves 60 and 70 may consist of electrically controlled pilot valves operable under control of small electrical currents supplied by control operator system 80. The reactor-burners 61 and 71 react a mixture of fuel and air, provided by fuel injector/mixers 62 and 72, to heat pressurized input air for example of 150 psi pressure, from tank 28 to a temperature of approximately 1800 F. This function is accomplished under the action of a catalyst-bed lean-burn combustion process within each reactor-burner. Burners 61 and 71 are controlled separately to determine which burner will supply heated air to reversing turbine 50. The choice of reactor-burner 61 or 71 dictates the direction of rotation of turbine 50. This determines the direction of motion, that is to push or to pull, that push rod 41 produces; thereby meeting the needs placed on actuator system 40 by operator control system 80.

To provide for actuator system 40 feedback control, an optical-encoder 44 is integrated within reversing turbine 50. This consists first of holes 56, shown in FIG. 5, through the turbine 50 web or gear web as shown in FIG. 3. As reversing turbine 50 rotates; each revolution, the holes (each in turn and not at the same time) come into alignment with a first beam of light 46 and a second light sensor 47. Light 46 and sensor 47 as a design choice may scan via holes 56 in turbine 50. The light sensor 47 receives light emitting through the hole opening, as alignment occurs, and responds by producing an electrical signal. The frequency and count-number of signals generated by light sensor 47 are fed-back to the operator control system computer 80 and used to determine the speed and position of push-rod 41 and thereby precisely-control the motion and position.

In accordance with an important feature of the present invention, there is shown in FIG. 4 a schematic diagram illustrating the operation of the reversing turbine 50 portion of the invention. Reversing turbine 50 consists of a single rotor 51 that locates around the outer perimeter of the rotor 51 two sets of oppositely-directed radial-inflow turbine blades; the push blade set 52, and the pull blade set 53. The multiplicity of blades contained in blade set 52 and 53 are designed to cause reversing turbine 50 to rotate in a preferred direction; either clockwise or counterclockwise. The direction of rotation of reversing turbine 50 is caused by the action of hot, high-pressure air impinging onto either blade set 52 or blade set 53 separately, and not at the same time. By the novel design of this turbine rotor, there are two separate nozzle and gas flow control system interfaces. These include nozzle 54 and hot-air source 61 for push-functions; and nozzle 55 and hot air source 71 for pull-functions, both meeting with the same rotor 51 but communicating with either blade set 52 (for push functions), or blade set 53 (for pull functions). Furthermore, these nozzles, 54 and 55, are independently operable, without interference from one to the other. This is accomplished by locating the two radial-inflow blade sets 52 and 53 at the same diameter of the turbine rotor 51, but mechanically separated and situated on opposite sides thereof. The opposed-sets of identical, but having reversed curve-profiles, blades enables the turbine direction of rotation to be controlled simply by selecting which nozzle 54 or 55 is fed by hot, high-pressure air. Because the turbine rotor 51 may be very small for example 1.0" diameter, with very high speed for example 100 K rpm, the time required to reverse the turbine is very short—on the order of 0.01 seconds for the example above—yet the power output can be very large—on the order of 2100 ft-lb./sec. This power is usefully taken advantage of through the function of the gear-reduction transmission 43 that makes the high-speed rotary turbine power available to the ball-screw push-pull actuator arm also known as push rod 41. The resultant gear reduction provides an actuator push rod 41 force output on the order of 3800 lbs. force and enables an actuator arm 41 maximum linear speed on the order of 6.5 in/sec. For the above example the gear reduction ratio is 32:1. This may be higher or lower as a matter of design choice.

FIG. 5 is a side view of FIG. 4. Radial blades 52 form a ring around the turbine wheel. When hot gas is directed on radial blades 52 they spin the wheel counterclockwise as shown in FIG. 5. Radial blades 53 also form a ring around the turbine wheel but on the far side and thus are shown by dotted lines. When hot gas is directed on them, they will spin the wheel in a clockwise direction.

To accomplish another important function of the invention, there is shown in FIG. 6 a schematic diagram illustrating the operation of the hot catalytic-bed reactor-burner portion of the invention. Each burner-reactor 61 and 71 is identical and is designed to react high-pressure air fed from storage tank means 28 with fuel supplied from storage source 29 as shown in FIG. 3. The fuel and high-pressure air are mixed in fuel injector mixing means 62 and 72 in advance of being supplied to each reactor-burner tank 61 and 71. Each reactor-burner tank 61 and 71 contains a catalytic bed 63 shown in FIG. 6 and a hot-wire glow plug means 64 fed by power from electrical power 90 and controlled by operator control system 80. The beneficial function of catalytic bed 63 is to react a lean-mixture of high-pressure air with fuel, burning this mixture quickly by a very short combustion-reaction time constant. This provides efficient, clean, and complete combustion; all within the confines of a short burner tank. It also provides the ability to rapidly start the combustion process, once catalytic bed 63 is heated to normal operating temperature. Finally, the high-temperature air output, for example 1800° F. from burner 61 promotes more-efficient energy-extraction from the turbine output stage of the actuator system 40.

To accomplish a further important function of the invention, there is shown in FIG. 7 a schematic diagram illustrating the operation of the integrated internal-combustion engine 25 and air compressor 27 portions of the invention.

FIG. 7 shows a hybrid piston-crank internal combustion engine 72 and air compressor 73 as one possible embodiment. In this embodiment, a two-cylinder machine is illustrated having a common crankshaft 74 and two piston-cylinders 75 configured in a vee arrangement. One cylinder and piston forms the internal-combustion engine 72 (in either a two-cycle or four-cycle configuration) that is operable to drive the opposite slaved piston and cylinder, the air compressor portion of the engine-compressor assembly. The two machines are joined by the common crankshaft 74 to form a hybrid engine-air compressor that is both compact and operable to convert fuel-based chemical energy into mechanical energy in the form of compressed air. A common air storage tank 28 is also shown that receives compressed air for accumulation and storage.

An alternate embodiment to FIG. 7 is FIG. 8 which has a hybrid free-piston internal combustion engine 111 and air compressors 130. In this embodiment a two-piston machine is illustrated having a common combustion chamber 116 and two double-duty pistons 117 configured in a linear cylinder 118, known as an opposed-piston inward-firing free-piston gasifier. Each double-duty piston 117 forms both an internal-combustion engine 111 (associated with the inner small-diameter piston) and an air compressor 130 (associated with the outer large-diameter piston). The opposite pistons and cylinders form two internal combustion engines 111 and air compressors 130, each the mirror image of the other. Both machines are joined within a common cylinder 118 and by a common combustion chamber 116 to form a hybrid free-piston engine-air compressor (well known in prior art as a free-piston gasifier) that is both compact and operable to convert fuel-based chemical energy into mechanical energy in the form of compressed air. A common air storage tank 121 which has a plurality of intake ports 119 is also shown that receives compressed exhaust air via intake ports 119 for accumulation and storage. The air compressor actually functions as a supercharger for the combustion chamber. That is, the compressed air with added fuel is manifolded into the combustion chamber prior to the motion of the pistons to the center of the engine. Upon ignition, the expanding gas at first propels pistons 111 outward, then exhaust at high pressure into manifold 137. Pistons 111 are slowed and stopped by air in bounce chamber 132, one for each piston 111. As the air in bounce chambers 132 is compressed it slows, stops, and then pushes pistons 111 back towards each other. As bounce chambers 132 are still being compressed new intake air is brought into compressor 130 via air intake valves 113. When pistons 111 are relatively far apart air from storage tank 121 enters engine 116. As pistons 111 approach each other the air intake is sealed off and storage tank 121 is refilled via air intakes 119. This process produces high pressure output air that may be heated to a temperature of approximately 800° F. This improves overall Brayton-cycle efficiency and reduces the requirement for heat addition provided by catalytic burners 61 and 71 shown previously while at the same time providing a more compact engine and compressor arrangement. The combination and method of using a free-piston engine and air compressor (i.e. any form of free-piston gasifier) within an actuation system will provide for many new applications.

As an example, the uniquely combined elements described above provide an actuator system 40 and a method that offers the beneficial features of:

Generating significant force to move objects; on the order of 3800 lbf.

Providing precise movement with typical position accuracy of 0.005".

Producing large-displacement, linear motion on the order of 6" stroke.

Producing rapid motion on the order of 6.5"/sec linear output motion with 15–20 Hz Bandwidth response characteristic and 25 Hz Bandwidth open-loop response.

Having an efficient energy-conversion from power source 10 to push rod 41 on the order of 9% overall thermodynamic efficiency with potential for further improvement to 25%.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A machine for generating actuation force with rapid, precise, and large displacement motion comprising:

a power source;

a pneumatic power supply system operably connected to said power source for providing compressed air;

an electric power source connected to said power source such that said electrical power source is recharged as needed by said power supply;

an actuation system which comprises two burners, a push burner and a pull burner, each burner connected to said power supply and to said electrical power supply, said burners each having an exhaust port; two control valves, one for each burner, each connected to said pneumatic power source to receive compressed air, each connected to said control operator such that said control operator can only activate one of said two control valves at a time, and one of said control valves feeding compressed air to said push burner and the remaining of said control valves feeding air to said pull burner; a reversing turbine operably mounted next to the exhaust port of each burner such that said reversing turbines spins one direction, clockwise due to one burner's exhaust port and spins the opposite direction, counterclockwise due to the second burner's exhaust port; a speed reducing transmission operably connected to said reversing turbine to provide a predetermined rate of motion change to variations in speed of said reversing turbine; a ball-screw push rod mounted to said speed reducing transmission for providing preselected force and motion output; and a control operator connected to said actuator system to direct changes to the motion of said push rod in a predictable manner.

2. An actuation force machine as described in claim 1 where said power source comprises an internal combustion engine, and a fuel supply.

3. An actuation force machine as claimed in claim 2, where said internal combustion engine comprises a crankshaft.

4. An actuation force machine as claimed in claim 1 where said electrical power supply comprises an alternator driven by said power supply; and a battery connected to said alternator such that battery is charged adequately to provide electrical power to said actuator system.

5. An actuation force machine as claimed in claim 2 where said electrical power supply comprises an alternator driven by said power supply; and a battery connected to said alternator such that battery is charged adequately to provide electrical power to said actuator system.

6. An actuation force machine as claimed in claim 3 where said electrical power supply comprises an alternator driven by said power supply; and a battery connected to said alternator such that battery is charged adequately to provide electrical power to said actuator system.

7. An actuation force machine as described in claim 1 where said two burners further comprise catalytic-bed combustion reactors.

8. An actuation force machine as described in claim 3 where said two burners further comprise catalytic-bed combustion reactors.

9. An actuation force machine as described in claim 6 where said two burners further comprise catalytic-bed combustion reactors.

10. An actuation force machine as claimed in claim 1 where said reversing turbine has two blade sets one for rotating said turbine in a clockwise direction and the second blade set for rotating said turbine in a counterclockwise direction, said configuration of said two blade sets requiring separate gas input to each to drive said turbine.

11. An actuation force machine as claimed in claim 3 where said reversing turbine has two blade sets one for rotating said turbine in a clockwise direction and the second blade set for rotating said turbine in a counterclockwise direction, said configuration of said two blade sets requiring separate gas input to each to drive said turbine.

12. An actuation force machine as claimed in claim 6 where said reversing turbine has two blade sets one for rotating said turbine in a clockwise direction and the second blade set for rotating said turbine in a counterclockwise direction, said configuration of said two blade sets requiring separate gas input to each to drive said turbine.

13. An actuation force machine as claimed in claim 9 where said reversing turbine has two blade sets one for rotating said turbine in a clockwise direction and the second blade set for rotating said turbine in a clockwise direction and the second blade set for rotating said turbine in a counterclockwise direction, said configuration of said two blade sets requiring separate gas input to each to drive said turbine.

14. An actuator force machine as claimed in claim 1 where said actuator system further comprises an optical encoder position and speed feedback sensor connected to said speed reducing transmission to monitor the speed and direction of said speed reducing transmission and also having said sensor output fed to said control operator.

15. An actuation force machine as described in claim 1 where said power source and pneumatic power supply comprises a hybrid engine-compressor free piston having two opposing pistons in a housing with a single engine compartment, two bounce chamber compressors one connected to each of said pistons within said housing such that as said pistons move away from each other each bounce chamber compressor shows, stops and then pushes said pistons back towards the other at the same time, a fuel source for injecting fuel into said engine compartment connected to said engine compartment, two compression chambers, one each around each of said pistons, said compression chambers decreasing in volume as said bounce chamber compressors move said pistons towards each other;

an air transfer chamber which receives air from said two compression chambers while said pistons are moving towards each other and which exhausts air into said engine compartment while said pistons are moving away from one another;

a manifold for venting combustion gases from said engine compartment after combustion has occurred; and an air intake connected to said compression chamber for filling them with air while said pistons are moving apart.

16. An actuator force machine as claimed in claim 7 where said actuator system further comprises an optical encoder position and speed feedback sensor connected to said speed reducing transmission to monitor the speed and direction of said speed reducing transmission and also having said sensor output fed to said control operator.

17. An actuator force machine as claimed in claim 11 where said actuator system further comprises an optical encoder position and speed feedback sensor connected to said speed reducing transmission to monitor the speed and direction of said speed reducing transmission and also having said sensor output fed to said control operator.

* * * * *